(12) United States Patent    (10) Patent No.: US 12,573,102 B2

Kato et al.    (45) Date of Patent: Mar. 10, 2026

(54) IMAGE PROCESSING APPARATUS, IMAGE PROCESSING METHOD, AND NON-TRANSITORY COMPUTER READABLE STORAGE MEDIUM THAT OBTAIN INFORMATION INDICATING A POSITION OF DEFORMATION OF A STRUCTURE IN AN IMAGE CAPTURING THE STRUCTURE

(71) Applicant: CANON KABUSHIKI KAISHA, Tokyo (JP)

(72) Inventors: Shu Kato, Kanagawa (JP); Tomoyuki Shigeta, Kanagawa (JP); Keigo Kurihara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 328 days.

(21) Appl. No.: 18/347,712

(22) Filed: Jul. 6, 2023

(65) Prior Publication Data

US 2024/0078720 A1    Mar. 7, 2024

(30) Foreign Application Priority Data

Sep. 5, 2022    (JP) ................................. 2022-141015

(51) Int. Cl.
   *G06T 11/00*      (2006.01)
   *G06T 7/70*      (2017.01)
   *G06T 7/90*      (2017.01)

(52) U.S. Cl.
   CPC .............. *G06T 11/001* (2013.01); *G06T 7/70* (2017.01); *G06T 7/90* (2017.01)

(58) Field of Classification Search
   CPC . G06T 11/001; G06T 7/70; G06T 7/90; G06T 2207/30132; G06T 7/0004
   See application file for complete search history.

(56) References Cited

U.S. PATENT DOCUMENTS

2023/0368449 A1 * 11/2023 Tsukikawa ............ G06T 7/0002

FOREIGN PATENT DOCUMENTS

| | | |
|---|---|---|
| JP | 6569002 B | 8/2019 |
| WO | 2017/103982 A | 6/2017 |
| WO | 2017/168737 A1 | 10/2017 |
| WO | 2021/171839 A | 9/2021 |
| WO | 2021/199830 A | 10/2021 |

OTHER PUBLICATIONS

Japanese Office Action issued Jul. 26, 2024, in corresponding Japanese Patent Application No. 2022-141015, with English translation (8 pages).
Japanese Office Action issued Sep. 26, 2025, in corresponding Japanese Application No. 2024-180336 with English Translation.

* cited by examiner

*Primary Examiner* — Christopher Wait
(74) *Attorney, Agent, or Firm* — Venable LLP

(57) ABSTRACT

An image processing apparatus including at least one processor and at least one memory coupled to the at least one processor, the memory storing instructions that, when executed by the processor, cause the processor to act as an obtaining unit configured to obtain information indicating a position of deformation of a structure in an image capturing the structure and a display control unit configured to display a first deformation object indicating the position of the deformation of the structure in a superimposed manner on the image capturing the structure, and to perform control to decide a color of the first deformation object in the superimposed display in accordance with a color of a background of the first deformation object.

17 Claims, 5 Drawing Sheets

FIG. 1

F I G. 3
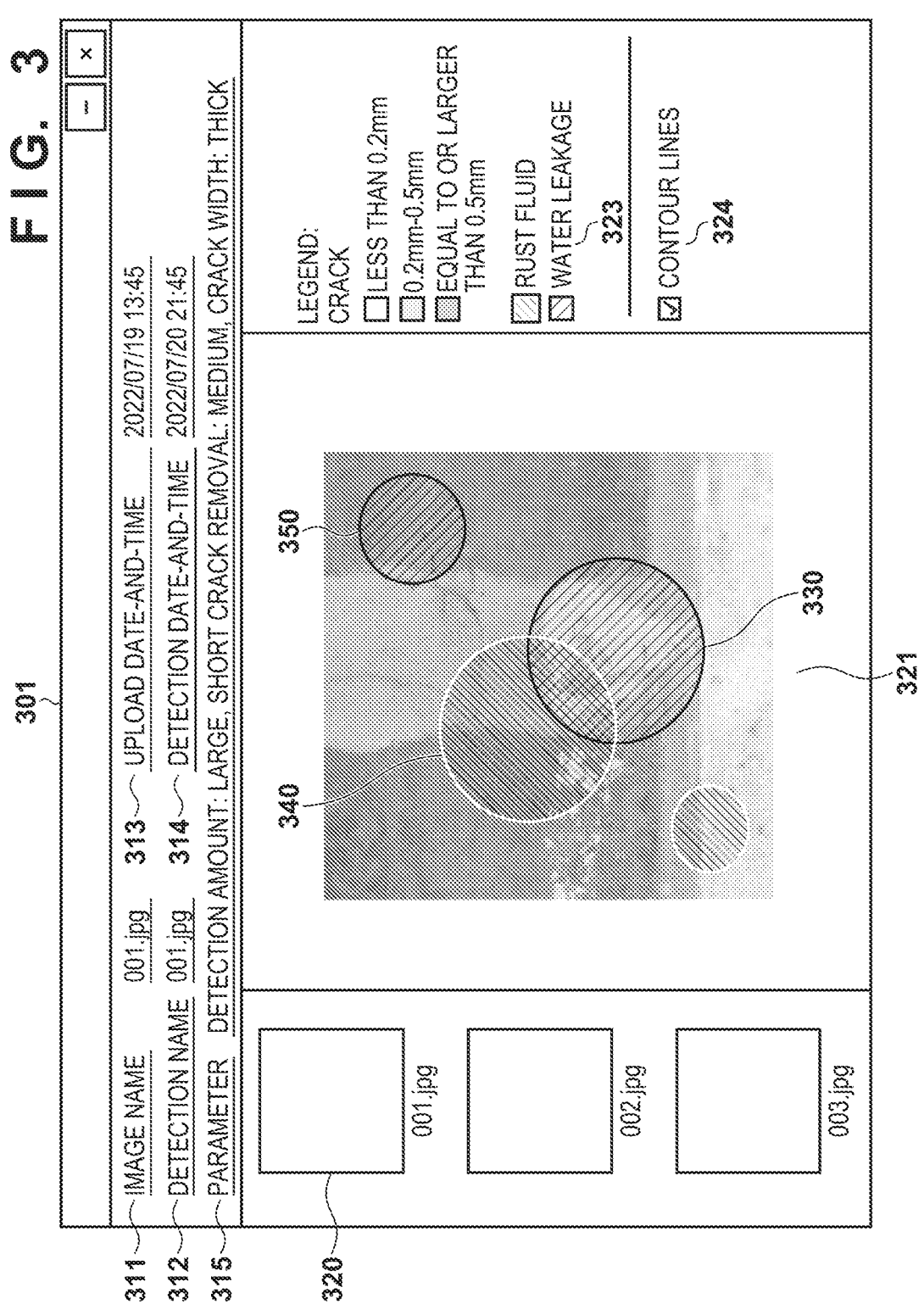

IMAGE PROCESSING APPARATUS, IMAGE PROCESSING METHOD, AND NON-TRANSITORY COMPUTER READABLE STORAGE MEDIUM THAT OBTAIN INFORMATION INDICATING A POSITION OF DEFORMATION OF A STRUCTURE IN AN IMAGE CAPTURING THE STRUCTURE

CROSS REFERENCE TO PRIORITY APPLICATION

This application claims the benefit of Japanese Patent Application 2022-141015, filed Sep. 5, 2022, which is hereby incorporated by reference herein in its entirety.

BACKGROUND OF THE INVENTION

Field of the Invention

The present invention relates to an image processing apparatus, an image processing method, and a non-transitory computer readable storage medium.

Description of the Related Art

In recent years, image analysis is used for detecting deformation (e.g., cracking) of a structure. For example, there has been proposed a technique for displaying, on a screen, results of detecting deformation of a structure from an image (Japanese Patent No. 6569002). Lines indicating positions of each deformation can be displayed on the screen with their colors or types being differentiated from each other according to the widths of each deformation (Japanese Patent No. 6569002). The foregoing method allows the user to visually recognize each deformation on the screen.

SUMMARY OF THE INVENTION

According to the present invention, it is possible to provide an image processing apparatus that allows for distinguishing each of a deformation object and its background displayed on an image in a superimposed manner, even when the color of the deformation object and the color of its background are similar.

The present invention in one aspect provides an image processing apparatus comprising at least one processor, and at least one memory coupled to the at least one processor, the memory storing instructions that, when executed by the processor, cause the processor to act as an obtaining unit configured to obtain information indicating a position of deformation of a structure in an image capturing the structure, and a display control unit configured to display a first deformation object indicating the position of the deformation of the structure in a superimposed manner on the image capturing the structure, and to perform a control to decide a color of the first deformation object in the superimposed display in accordance with a color of a background of the first deformation object.

The present invention in another aspect provides an image processing method comprising obtaining information indicating a position of deformation of a structure in an image capturing the structure, displaying a first deformation object indicating the position of the deformation of the structure in a superimposed manner on the image capturing the structure, and performing a control to decide a color of the first deformation object in the superimposed display in accordance with a color of a background of the first deformation object.

The present invention in yet another aspect provides a non-transitory computer-readable storage medium storing instructions that, when executed by a computer, cause the computer to perform an image processing method comprising obtaining information indicating a position of deformation of a structure in an image capturing the structure, displaying a first deformation object indicating the position of the deformation of the structure in a superimposed manner on the image capturing the structure, and performing a control to decide a color of the first deformation object in the superimposed display in accordance with a color of a background of the first deformation object.

Further features of the present invention will become apparent from the following description of exemplary embodiments (with reference to the attached drawings).

BRIEF DESCRIPTION OF THE DRAWINGS

FIG. 1 is a block diagram illustrating an example of a hardware configuration of an image processing apparatus;

FIG. 3 is a diagram illustrating an example of a viewing screen of an image analysis result;

DESCRIPTION OF THE EMBODIMENTS

Figure 2:
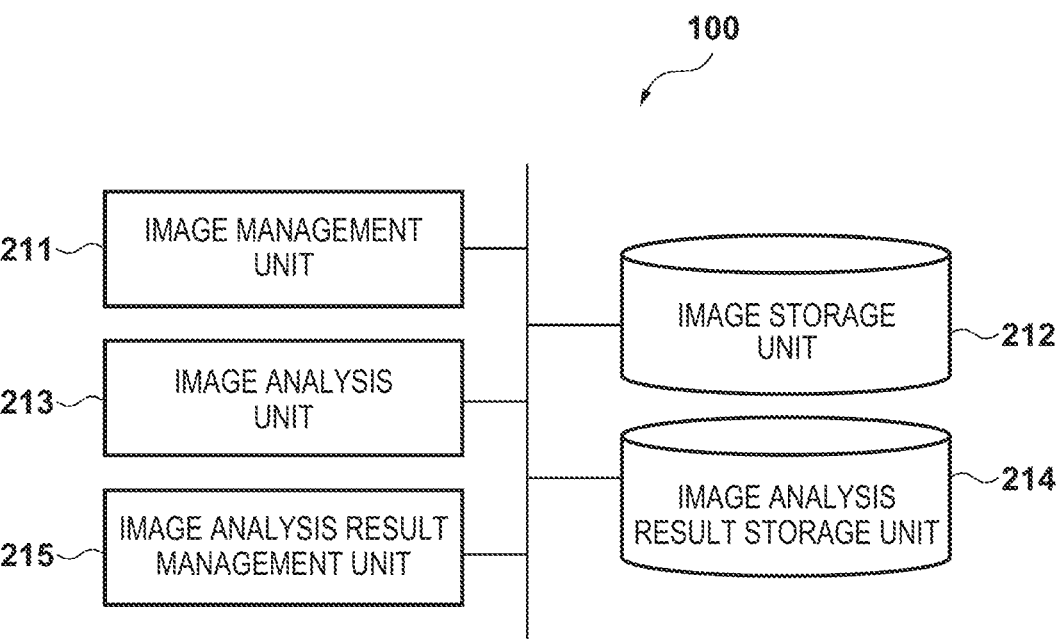
FIG. 2 is a block diagram illustrating an example of a functional configuration of an image processing apparatus.

Hereafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

In a first embodiment, an image indicating a position of deformation of a structure is displayed on a screen, and any one or more of hue, saturation, and brightness of a contour line of the deformation is changed according to the type of deformation. Here, deformation refers to a crack that occurs on a concrete surface due to damage, degradation, or other factors of a structure such as an expressway, a bridge, a tunnel, a dam, or the like. A crack refers to a linear damage that occurs on a wall surface of a structure due to aging degradation and earthquake shock, and has a start point, an end point, a length and a width.

Figure 1:
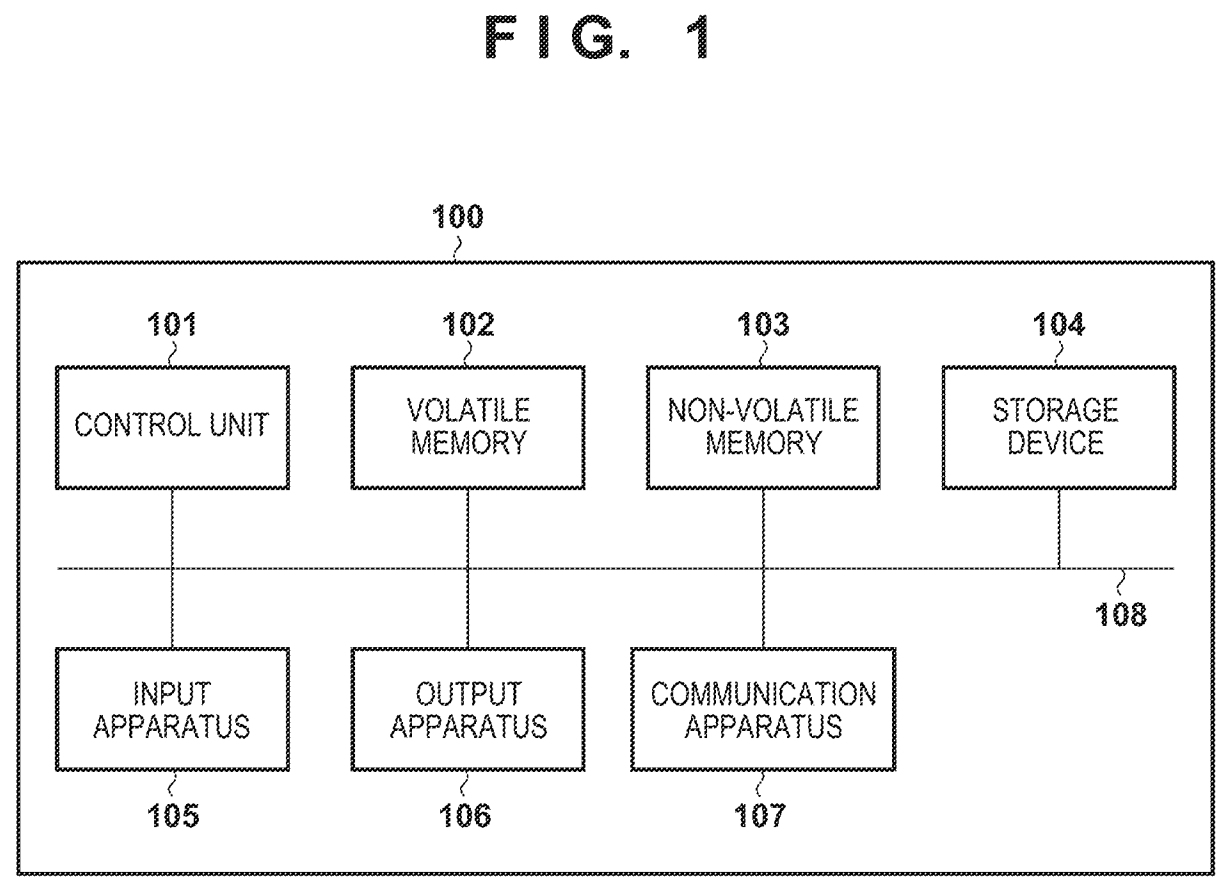

FIG. 1 is a block diagram illustrating an example of a hardware configuration of an image processing apparatus.

In the embodiment described below, a computer operates as an image processing apparatus 100. Here, processing by the image processing apparatus in the present embodiment may be implemented by a single computer, or may be implemented by distributing each function across a plurality of computers, as necessary. The plurality of computers are communicatively connected to each other.

The image processing apparatus 100 includes a control unit 101, a volatile memory 102, a non-volatile memory 103, a storage device 104, an input apparatus 105, an output apparatus 106, a communication apparatus 107, and a system bus 108.

The control unit 101 includes an arithmetic operation processor that integrally controls the entire image processing apparatus 100, such as a Central Processing Unit (CPU), a Micro Processor Unit (MPU), or the like.

The volatile memory 102 is a Random Access Memory (RAM) that temporarily stores programs and data supplied from an external apparatus, or the like.

The non-volatile memory 103 is a Read-Only Memory (ROM) that stores programs to be executed by the processor of the control unit 101 and parameters.

The storage device 104 is an internal appliance such as a hard disk and a memory card built in the image processing apparatus 100, or an external appliance such as a hard disk and a memory card detachably connected to the image processing apparatus 100. The storage device 104 includes a memory card formed of a semiconductor memory, a hard disk formed of a magnetic disk, and the like. In addition, the storage device 104 includes a disk drive that performs reading and writing data from and to an optical disk such as a DVD or a Blu-ray Disc.

The input apparatus 105 is a mouse, a keyboard, a touch panel, and the like, that accepts user operations, and outputs, to the control unit 101, instructions related to the accepted user operations.

The output apparatus 106 is a display apparatus such as a Liquid Crystal Display (LCD) or an organic EL display, and displays data held by the image processing apparatus 100 and data supplied from an external appliance.

The communication apparatus 107 is an apparatus communicatively connected to a network such as the Internet or a Local Area Network (LAN).

The system bus 108 includes an address bus, a data bus, and a control bus that enable transmission and reception of data between each unit included in the image processing apparatus 100.

The non-volatile memory 103 stores an Operating System (OS), which is basic software executed by the control unit 101, and applications that implement applicative functions in cooperation with the OS. In addition, the non-volatile memory 103 stores an application that implements image analysis processing to detect deformation from an image of an inspection target, described later, which is captured by the image processing apparatus 100.

The processing in the image processing apparatus 100 is implemented by the control unit 101 reading and executing software provided by the application. Here, the application includes software for using basic functions of the OS installed in the image processing apparatus 100. Alternatively, the OS of the image processing apparatus 100 may include software for implementing the processing in the present embodiment.

FIG. 2 is a block diagram illustrating an example of a functional configuration of the image processing apparatus.

The image processing apparatus 100 includes an image management unit 211, an image storage unit 212, an image analysis unit 213, an analysis result storage unit 214, and an analysis result management unit 215. Each of the functions of the image processing apparatus 100 is implemented by hardware and software. Here, each of the functional units may be configured as a system in which one or more computers and servers are connected via a network.

The image management unit 211 has functions such as storing, deleting, listing, and viewing images.

The image storage unit 212 stores image data.

The image analysis unit 213 executes image analysis using a learned model created by machine learning and deep learning of Artificial Intelligence (AI), in order to detect deformation from a captured image of an inspection target.

The analysis result storage unit 214 stores image analysis results.

The analysis result management unit 215 has a function such as viewing and obtaining image analysis results stored in the analysis result storage unit 214.

The analysis result management unit 215 presents, to the user via the output apparatus 106, a viewing screen of an image analysis result described later.

The analysis result management unit 215 has a function such as viewing and obtaining image analysis results stored in the analysis result storage unit 214. The analysis result management unit 215 presents, to the user, a viewing screen of an image analysis result (illustrated in FIG. 3) and a viewing screen of parameter comparison (illustrated in FIG. 4).

In the following, an example of a workflow when detecting deformation from a captured image of an inspection target (e.g., a concrete structure) will be described as a premise of the present embodiment. In the present embodiment, deformation of the concrete structure is detected by performing image analysis using a learning model on an image of a wall surface of the concrete structure captured by a camera.

When an image of an inspection target is captured on-site, it is difficult to capture the entire range of the inspection target by a single image in a sufficient image resolution detectable for deformation of the inspection target. Therefore, close-up capturing operation of a part of the inspection target range is performed, by gradually changing the capturing range. Then, image processing such as enlargement, reduction, rotation, projective transformation, color adjustment, and noise removal is performed on each of a plurality of images captured in the aforementioned capturing procedure. Subsequently, a single composite image is generated by joining the plurality of images subjected to image processing.

Unlike the method of manually recording deformation while visually observing an image, detecting deformation with image analysis may cause erroneous detection or detection omission. Therefore, another image processing apparatus or an external server checks and corrects the deformation detection result. For example, in a case when the deformation is a crack, an analysis result (i.e., a deformation object) is created, in which crack information is overlaid on a drawing or an image, with the length and the width of the crack being added. Here, the deformation object is not limited to one obtained by superimposing information of a crack occurred in a structure on a drawing or an image, and includes information of any deformation occurring in a structure (e.g., information about a site of rust fluid or water leakage) superimposed on a drawing or an image. The deformation object may be a graphic indicating a deformed part. For example, the deformation object may be a graphic enclosing a deformed part (specifically, a circle, a rectangle, or contour lines thereof), or may be a graphic (e.g., a line, having a predetermined thickness, along a crack) having a shape corresponding to the shape of the deformation.

FIG. 3 is a diagram illustrating an example of a viewing screen of an image analysis result.

A viewing screen 301 of an image analysis result is a screen on which the result of each analysis image can be viewed. In the viewing screen 301, an image file name 311, a detection name 312, an upload date-and-time 313, a detection date-and-time 314, a parameter 315, a list of analyzed images 320, an analysis result display field 321, and a legend display field 323 are displayed.

In the image file name 311, an image file name (e.g., "001.jpg") on which image analysis is executed is displayed.

In the detection name 312, a detection name (e.g., "001.jpg") is displayed.

In the upload date-and-time 313, an upload date-and-time (e.g., "2022/07/19 13:45") is displayed.

In the detection date-and-time 314, a detection execution date-and-time (e.g., "2022/07/19 21:45") is displayed.

In the parameter 315, parameter values (e.g., "detection amount: large, short crack removal: medium, crack width: thick") are displayed.

In the analysis result display field 321, an analysis result 330 of a crack, or the like, is displayed in an overlaid manner on the image of the detection target as deformation detected in the image analysis. The analysis result 330 includes actual size information of the length and the thickness (width) of the crack. The analysis result 330 is identifiably displayed in different display forms (e.g., color or line type) according to the length and the thickness (width) of the crack.

In the legend display field 323, the actual size information of the length and the thickness (width) of the crack, display color corresponding to the actual size information, display color corresponding to each of the rust fluid and water leakage, and a check box of the contour line, or the like, are displayed. As such, a display form for each type of deformation and a check box of the contour line are displayed. Furthermore, the display form can be changed. The actual size information of the length and the thickness (width) of the crack may be calculated based on the image resolution and the number of pixels in the image. In addition, the coordinates of the analysis result 330 are converted into numerical values adapted to the coordinate system of the drawing by comparing the actual size information of the deformation with the data of the drawing. Accordingly, the analysis result 330 can be viewed and edited by the image processing apparatus or an external server.

Displaying or not displaying the contour line is switched in accordance with the contour line check box 324 being checked or not checked. Accordingly, the user can select whether or not to display the contour line on the analysis result display field 321.

Figure 4:
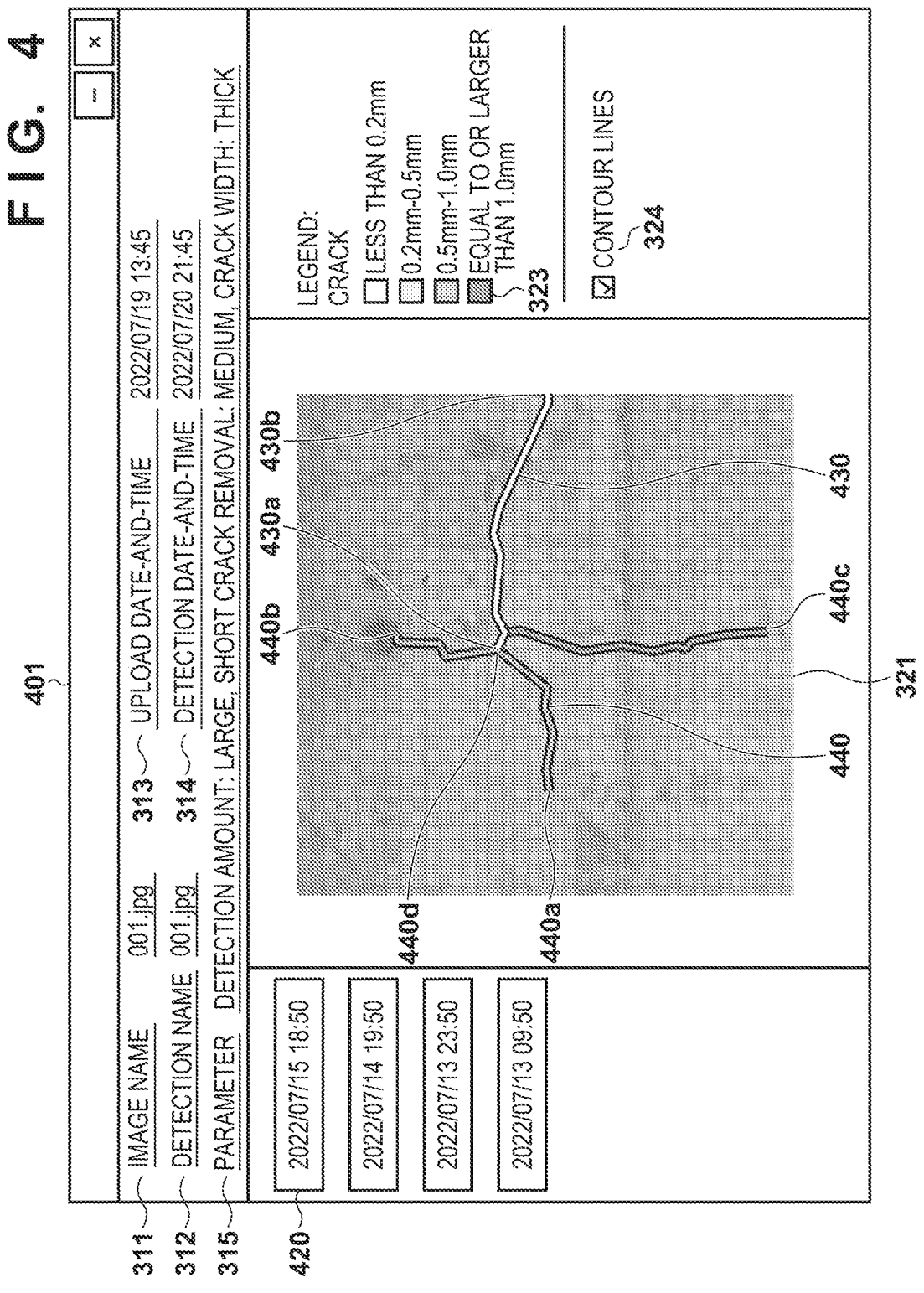
FIG. 4 is a diagram illustrating an example of a viewing screen of parameter comparison.

FIG. 4 is a diagram illustrating an example of a viewing screen of parameter comparison.

A comparison viewing screen 401 of parameter is a screen on which time series comparison and parameter comparison (setting of detection amount and small region removal) can be performed. In the comparison viewing screen 401, an image file name 311, a detection name 312, an upload date-and-time 313, a detection date-and-time 314, a parameter 315, a detection date-and-time list 420, an analysis result display field 321, a legend display field 323, and a contour line check box 324 are displayed.

The image file name 311 to the parameter 315, and the analysis result display field 321 to the contour line check box 324 have already been described, referring to FIG. 3, and therefore description thereof will be omitted.

In the detection date-and-time list 420, detection date-and-times (e.g., "2022/07/15 18:50", "2022/07/14 19:50", "2022/07/13 23: 50", and "2022/07/13 09:50") are displayed.

Figure 5:
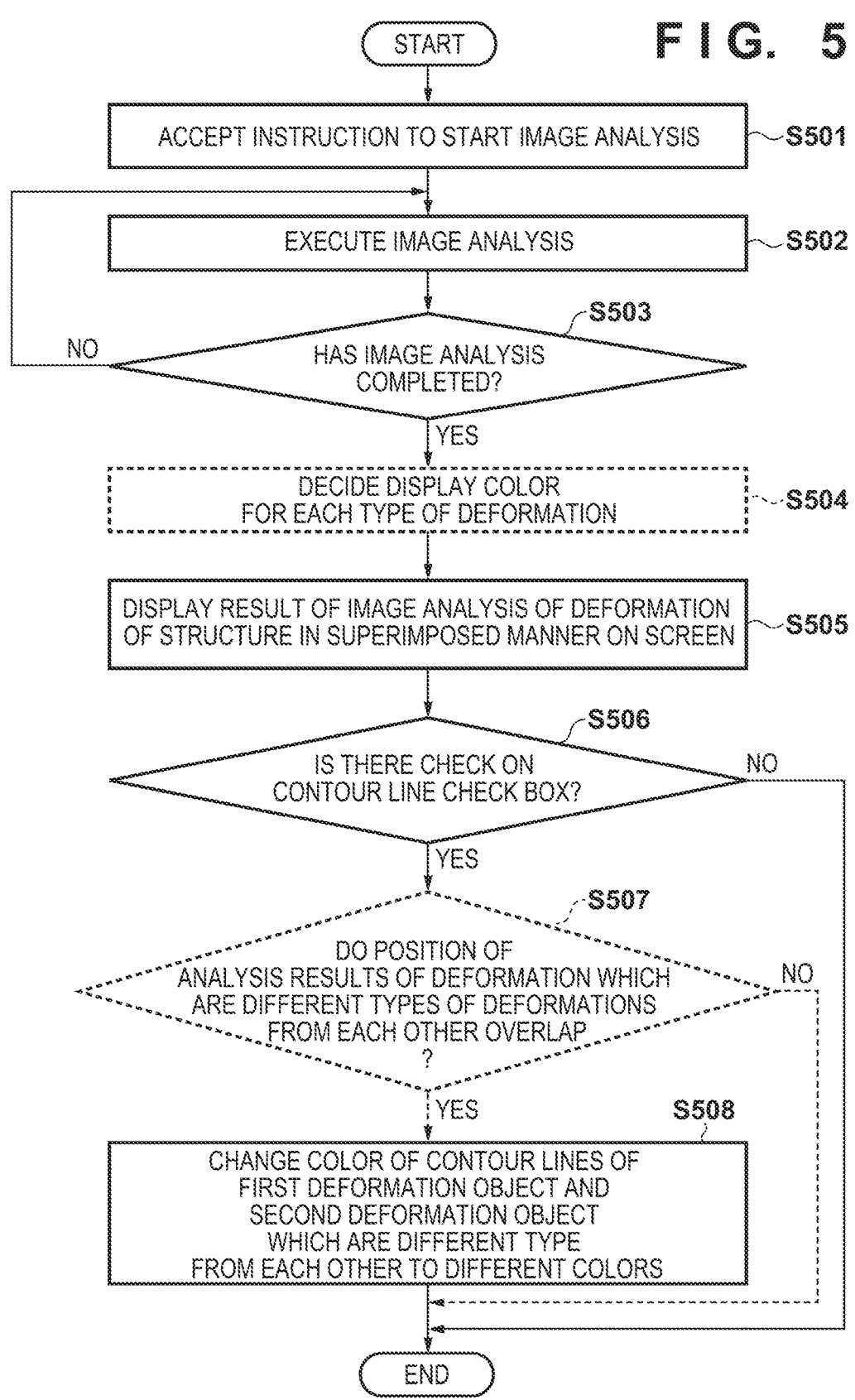
FIG. 5 is a flowchart illustrating the processing executed by an image processing apparatus.

FIG. 5 is a flowchart illustrating processing executed by the image processing apparatus. In the following, the flow of the processing will be described, referring to FIG. 3.

The processing is implemented by the control unit 101 of the image processing apparatus 100 illustrated in FIG. 1 deploying a program stored in the non-volatile memory 103 to the volatile memory 102 and executing the same.

At S501, the control unit 101 displays, on the output apparatus 106, a list of uploaded images. The control unit 101 accepts a selection of a desired image file and an instruction to start analysis.

At S502, the image analysis unit 213 executes image analysis of the selected image file.

At S503, the control unit 101 determines whether or not the image analysis by the image analysis unit 213 is completed. When the control unit 101 determines that the image analysis by the image analysis unit 213 is completed (Yes at S503), the processing proceeds to S504. Here, when the processing at S504 is not necessary, the processing proceeds to S505. When the control unit 101 determines that the image analysis by the image analysis unit 213 is not completed (No at S503), the processing returns to S502.

At S504, the control unit 101 displays, on the output apparatus 106, information in which a result of deciding display color for each type of deformation and a legend are associated. Here, a method is described by which the control unit 101 decides display color for each type of deformation. Although deformation in the present embodiment is classified into three categories: "crack", "rust fluid", and "water leakage", the invention is not limited thereto. For example, flaking, efflorescence, and rebar exposure may be included as deformation. The category of "crack" may be further categorized into three types (e.g., less than 0.2 mm, 0.2 mm to less than 0.5 mm, 0.5 mm and above). The control unit 101 then decides display color for the categories of "crack", "rust fluid", and "water leakage" in accordance with the degree of importance (or the degree of risk), with which the deformation of the structure need to be promptly addressed by the user. It is assumed that the category "water leakage" is of the highest importance, the category "rust fluid" is of the second highest importance, and the category "crack" is of the lowest importance. The degree of importance of each category may be preliminarily set by the user. The control unit 101 decides, based on the degree of importance of each category, to display the color of "water leakage" with the darkest color, the color of "rust fluid" with intermediate color density, and the color of "crack" with light color. Furthermore, as for display color of the three types of categories of "crack", the control unit 101 decides, according to each crack width, the color for displaying the category of each crack width. As another example, a different display color may be decided for respective categories such as "crack", "rust fluid", and "water leakage". A result of deciding display color for each type of deformation is thus obtained. Here, the information may be preliminarily set, or may be desirably changed by the user.

At S505, the analysis result storage unit 214 stores the analysis result. In addition, the analysis result management unit 215 displays, on the output apparatus 106, an image in which the analysis result is superimposed on the image of the viewing screen 301 or the comparison viewing screen 401. At this time, the control unit 101 calculates a color difference d between the color of the analysis result 350 and the color of the image at a position where a part of the analysis result 350 is overlapping with the image, according to a color difference formula (e.g., the following formula (1)) of the RGB color space or CIE DE2000. Here, the overlapping position is a part of the analysis result 350, and is represented by two dimensional coordinates (x, y), for example.

$$d=\sqrt{(R_2-R_1)^2+(G_2-G_1{}^2)^2+(B_2-B_1{}^2)^2}$$  (Formula 1)

Here, d is a color difference, $R_1$, $G_1$ and $B_1$ are RGB values of the analysis result, and $R_2$, $G_2$ and $B_2$ are RGB values of the image.

When the color difference d is less than a threshold value, the control unit 101 may change any one or more of hue, saturation, and brightness of the color of the contour line of the analysis result 350. When the color difference d is less than the threshold value, for example, the control unit 101 displays the color of the contour line of the analysis result 350 in black as illustrated in FIG. 3, and displays the image without changing the color of the image. Here, although the control unit 101 has changed the color of the entire circumference of the contour line of the analysis result 350, the invention is not limited thereto, and the color of a part of the contour line may be changed or the color of the entire analysis result 350 may be changed. When, on the other hand, the color difference d is equal to or greater than the threshold value, the control unit 101 does not change any one or more of hue, saturation, and brightness of the color of the contour line of the analysis result 350, and does not change the color of the image.

As has been described above, the color of the contour line of the analysis result 350 is changed to black, for example, and the color of the image is not changed, in a case when the color of the analysis result 350 and the color of the image are similar at a position where the analysis result 350 and the image overlap. Accordingly, the user can visually recognize each of the analysis result 350 and the image with ease.

At S506, the control unit 101 determines whether or not the contour line check box 324 is checked. When the control unit 101 determines that the contour line check box 324 is checked (Yes at S506), the processing proceeds to S507. When the control unit 101 determines that the contour line check box 324 is not checked (No at S506), the processing terminates.

At S507, the control unit 101 determines whether or not the analysis result 330 and the analysis result 340 overlap, based on whether or not a distance $d_1$ (not illustrated) between a predetermined position of the analysis result 330 and a predetermined position of the analysis result 340 is larger than a threshold value. The predetermined position may be any position provided that it allows for determining whether the analysis result 330 and the analysis result 340 overlap. The predetermined position may be, for example, either a position at the center position and a position on the circumference of each of the analysis result 330 and the analysis result 340. Here, changing the color of the analysis result according to whether or not the analysis results overlap is an example of changing the color of the analysis result according to the color of the background of the analysis result. Returning to the foregoing description, the threshold value is the sum of a radius $r_1$ (not illustrated) of the analysis result 330 and a radius $r_2$ (not illustrated) of the analysis result 340 (that is, the threshold value=$r_1$+$r_2$). Here, the analysis result 330 and the analysis result 340 respectively represent analysis results of different types of deformation. For example, the analysis result 330, which is displayed in dark gray, indicates that the deformation is "water leakage". On the other hand, the analysis result 340, which is displayed in light gray, indicates that the deformation is "rust fluid".

When the distance $d_1$ is less than the threshold value (=$r_1$+$r_2$), the control unit 101 determines that the position of a part of the analysis result 330 and the position of a part of the analysis result 340 overlap (Yes at S507), and the processing proceeds to S508. When, on the other hand, the distance $d_1$ is not less (i.e., is greater) than the threshold value (=$r_1$+$r_2$), the control unit 101 determines that the position of a part of the analysis result 330 and the position of a part of the analysis result 340 do not overlap (No at S507), and the processing terminates.

Here, the control unit 101 can calculate the color difference d between the color of the analysis result 330 and the color of the analysis result 340 at the position where a part of the analysis result 330 and a part of the analysis result 340 overlap, according to the color difference formula of the RGB color space (e.g., the above formula (1)) or CIE DE2000.

At S508, the control unit 101 changes each of the color of the contour line of the analysis result 330 and the color of the contour line of the analysis result 340, such that the color difference d between the color of the contour line of the analysis result 330 and the color of the contour line of the analysis result 340 increases. Here, the control unit 101 changes each of the color of the contour line of the analysis result 330 and the color of the contour line of the analysis result 340 such that any one or more of hue, saturation, and brightness vary. For example, the control unit 101 respectively changes the color of the contour line of the analysis result 330 to black and the color of the contour line of the analysis result 340 to white. Accordingly, the color difference d increases in the brightness direction, and the user can visually recognize each of the analysis result 330 and the analysis result 340 with ease. Here, the analysis result 330 corresponds to a first deformation object, and the analysis result 340 corresponds to a second deformation object.

As such, according to the first embodiment, the color of the contour line of the first deformation object is changed such that the color difference between the color of the first deformation object and the color of the image increases, in a case when the color of the first deformation object and the color of the image are similar at a position where a part of the first deformation object and the image overlap. Accordingly, the user can visually recognize each of the first deformation object and the image with ease. Additionally, in a case when the color of the first deformation object and the color of the second deformation object are similar at a position where a part of the first deformation object and a part of the second deformation object overlap, each color of the contour lines of the first deformation object and the second deformation object are changed such that the color difference between the two objects increases. Accordingly, the user can visually recognize each of the first deformation object and the second deformation object with ease.

Second Embodiment

When a deformation object in which a position of a crack of a structure is traced is superimposed on an image, the control unit 101 superimposes, on the image, the deformation object in which a part of the contour line of the deformation object is not displayed. The result of superimposing the deformation objects on the image by the control unit 101 are the analysis result 430 and the analysis result 440 illustrated in FIG. 4. Here, the contour line (illustrated by a black thick line) at an edge 430a and an edge 430b of the analysis result 430 is not displayed. The edge 430a and the edge 430b represent the start point or the end point of the crack. In addition, the contour line (illustrated by a black thick line) at an edge 440*a*, an edge 440*b* and an edge 440*c* of the analysis result 440 is not displayed. The edge 440*a* to the edge 440*c* represent the start point or the end point of the crack.

Next, the control unit 101 determines whether or not the analysis result 430 and the analysis result 440 overlap, based on a comparison between a threshold value and a distance between a predetermined position (e.g., position of the edge 430*a*) of the analysis result 430 and a predetermined position (e.g., position of a part 440*d*) of the analysis result 440. The determination method described above is similar to that of the first embodiment, and, therefore, a detailed description thereof will be omitted. When the distance described above is equal to or less than the threshold value, the control unit 101 determines that the analysis result 430 and the analysis result 440 overlap.

Furthermore, the control unit 101 decides the order of displaying the analysis result 430 and the analysis result 440 in a superimposed manner on the image, based on whether or not each of the parts of the analysis result 430 and the analysis result 440 at the position where the analysis result 430 and the analysis result 440 overlap are specific parts (i.e., edges). When, at the overlapping position, the part of the analysis result 430 is determined to be the edge 430*a* and the part of the analysis result 440 is determined to be the part 440*d* that is other than the edge, the control unit 101 decides to display in the order of the analysis result 440 and the analysis result 430 in a superimposed manner on the image.

In this case, when the control unit 101 displays in the order of the analysis result 430 and the analysis result 440 in a superimposed manner on the image, the analysis result 440 is displayed on the edge 430*a* of the analysis result 430, and thus the edge 430*a* is concealed by the analysis result 440. When, on the other hand, the control unit 101 displays in the order of the analysis result 440 and the analysis result 430 in a superimposed manner on the image, the edge 430*a* is displayed without being concealed by the analysis result 440, as illustrated in FIG. 4. As has been described above, the control unit 101 determines the presence or absence of an overlap between the analysis results, and further determines the analysis result including an edge at the overlapping position. Based on the determination result, the control unit 101 draws the analysis result, on the foreground of the image, including an edge (i.e., a start point or an end point of deformation) at the overlapping position.

Accordingly, each of a plurality of deformation objects (analysis result 430 and analysis result 440) indicating the start point to the end point of the crack is displayed in a superimposed manner on the image, and thus the user can visually recognize each of the analysis result 430 and the analysis result 440. In other words, the user will not overlook the start point or the end point of the crack on the image anymore, and can quickly and accurately cope with deformation (e.g., a crack). As has been described above, the present embodiment has an excellent effect that it can contribute to improve the accuracy of infrastructure inspection.

Third Embodiment

In the first and second embodiments, a method of changing the display color of the contour line of the deformation object has been described. In the third embodiment, when a position of a graphic (e.g., a line, a circle, or a polygon) drawn on a structure with white chalk, for example, is detected from an image, the color of the part of the contour line of a deformation object overlapping with the position of the graphic drawn with the chalk is changed. Here, the control unit 101 changes the predetermined color of the part of the contour line of the deformation object to black, for example, such that the color difference between the color (e.g., white) at the position of the graphic drawn with the chalk and the color of the part of the contour line of the deformation object increases. Here, the control unit 101 does not change the color of the part of the contour line of the deformation object that does not overlap with the position of the graphic drawn with the chalk detected on the image. Alternatively, the control unit 101 may change any one or more of hue, saturation, and brightness of the color of the part of the contour line of the deformation object. Accordingly, it becomes easier for the user to distinguish the color of the position of the graphic drawn with the chalk from the color of the part of the contour line of the deformation object, and thus the visibility by the user is further improved.

Other Embodiments

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
   at least one processor; and
   at least one memory coupled to the at least one processor, the memory storing instructions that, when executed by the processor, cause the processor to act as:
   an obtaining unit configured to obtain information indicating a position of deformation of a structure in an image capturing the structure; and a display control unit configured to display a first deformation object indicating the position of the deformation of the structure in a superimposed manner on the image capturing the structure, and to perform control to decide a color of the first deformation object in the superimposed display in accordance with a color of a background of the first deformation object.

2. The image processing apparatus according to claim 1, wherein the background is a second deformation object that is different from the image or the first deformation object.

3. The image processing apparatus according to claim 2, wherein the color of the background is a color of a part of the image where the first deformation object is superimposed, or a color of the second deformation object overlaid on the first deformation object.

4. The image processing apparatus according to claim 3, wherein the display control unit performs control to change a color of at least a portion of the first deformation object from predetermined color, in a case when the background is the image and a color difference between the color of the first deformation object and the color of the background is less than a threshold value.

5. The image processing apparatus according to claim 4, wherein the display control unit performs control to set the color of the first deformation object to the predetermined color, in a case when the background is the image and the color difference is greater than the threshold value.

6. The image processing apparatus according to claim 2, wherein the processor is further caused to act as a decision unit configured to decide respective colors of the first deformation object and the second deformation object in accordance with respective types of the deformation of the first deformation object and the second deformation object, wherein the display control unit performs control to change the color decided by the decision unit such that the color of a contour line of the first deformation object and the color of a contour line of the second deformation object are displayed with different colors from each other, in a case when the background is the second deformation object and the color difference between the color of the first deformation object and the color of the second deformation object based on the decision result by the decision unit is less than a threshold value.

7. The image processing apparatus according to claim 6, wherein the display control unit performs control to set the color of the first deformation object and the color of the second deformation object, respectively, to a color based on the decision result by the decision unit, in a case when the background is the second deformation object, and the color difference is greater than the threshold value.

8. The image processing apparatus according to claim 1, wherein the display control unit displays the first deformation object in a superimposed manner on the image while not displaying a part of a contour line of the first deformation object.

9. The image processing apparatus according to claim 2, further comprising a determination unit configured to determine whether or not the first deformation object and the second deformation object overlap, based on a distance between a predetermined position of the first deformation object and a predetermined position of the second deformation object.

10. The image processing apparatus according to claim 9, wherein the determination unit determines which of the portion of the first deformation object and the portion of the second deformation object at the overlapping position includes a specific part, in a case when the first deformation object and the second deformation object overlap based on the distance, the display control unit displays, in a superimposed manner on the foreground of the image, the first deformation object or the second deformation object that includes the specific portion, based on the result of the determination by the determination unit, and the specific portion is a start point or an end point of the deformation.

11. The image processing apparatus according to claim 2, wherein the display control unit displays, in a superimposed manner on the foreground of the image, at least one of the first deformation object and the second deformation object indicating a position of deformation of a specific deformation type of the structure.

12. The image processing apparatus according to claim 1, wherein the deformation is at least one of a crack, water leakage, flaking, efflorescence, rebar exposure, and rust fluid.

13. The information processing apparatus according to claim 1, wherein the background is a graphic drawn on the structure in the image.

14. The image processing apparatus according to claim 6, wherein the color of the contour line of the first deformation object and the color of the contour line of the second deformation object are different from each other in at least any one of hue, saturation, and brightness.

15. The image processing apparatus according to claim 8, wherein the portion of the contour line of the first deformation object is an edge in a longitudinal direction of the first deformation object.

16. An image processing method comprising:

obtaining information indicating a position of deformation of a structure in an image capturing the structure; and displaying a first deformation object indicating the position of the deformation of the structure in a superimposed manner on the image capturing the structure, and performing a control to decide a color of the first deformation object in the superimposed display in accordance with a color of a background of the first deformation object.

17. A non-transitory computer-readable storage medium storing instructions that, when executed by a computer, cause the computer to perform an image processing method comprising:

obtaining information indicating a position of deformation of a structure in an image capturing the structure; and displaying a first deformation object indicating the position of the deformation of the structure in a superimposed manner on the image capturing the structure, and performing control to decide a color of the first deformation object in the superimposed display in accordance with a color of a background of the first deformation object.

* * * * *